United States Patent
Hamada

(10) Patent No.: US 9,426,316 B2
(45) Date of Patent: Aug. 23, 2016

(54) IMAGE READING APPARATUS, DISPLAY APPARATUS, NON-TRANSITORY COMPUTER READABLE RECORDING MEDIUM, AND IMAGE DISPLAYING METHOD

(71) Applicant: FUJI XEROX CO., LTD., Minato-ku, Tokyo (JP)

(72) Inventor: Makoto Hamada, Kanagawa (JP)

(73) Assignee: FUJI XEROX CO., LTD., Tokyo (JP)

(\*) Notice: Subject to any disclaimer, the term of this patent is extended or adjusted under 35 U.S.C. 154(b) by 0 days.

(21) Appl. No.: 14/292,295

(22) Filed: May 30, 2014

(65) Prior Publication Data
US 2015/0043020 A1 Feb. 12, 2015

(30) Foreign Application Priority Data
Aug. 9, 2013 (JP) .................. 2013-167136

(51) Int. Cl.
*G06F 3/12* (2006.01)
*H04N 1/00* (2006.01)
(52) U.S. Cl.
CPC ....... *H04N 1/00514* (2013.01); *H04N 1/00411* (2013.01); *H04N 1/00413* (2013.01); *H04N 1/00424* (2013.01); *H04N 1/00466* (2013.01); *H04N 1/00474* (2013.01); *H04N 1/00482* (2013.01); *H04N 1/00517* (2013.01)
(58) Field of Classification Search
None
See application file for complete search history.

(56) References Cited

U.S. PATENT DOCUMENTS

| 2007/0052993 | A1* | 3/2007 | Anno | G06F 21/6218 358/1.14 |
| 2008/0055661 | A1* | 3/2008 | Yoshida | H04N 1/00912 358/403 |
| 2011/0075210 | A1* | 3/2011 | Fukasawa | H04N 1/00 358/1.15 |
| 2011/0292438 | A1* | 12/2011 | Inami | H04N 1/00413 358/1.15 |
| 2012/0154863 | A1* | 6/2012 | Fuse | H04N 1/00416 358/1.15 |
| 2013/0003104 | A1* | 1/2013 | DeFore | G06F 3/1288 358/1.14 |

FOREIGN PATENT DOCUMENTS

JP 2011-077728 A 4/2011

\* cited by examiner

*Primary Examiner* — Marcus T Riley
(74) *Attorney, Agent, or Firm* — Sughrue Mion, PLLC

(57) ABSTRACT

Provided is an image reading apparatus including an image reading section that reads an image formed on a recording medium to generate image data, a display section that displays plural selection images that are registered in advance, used in selection of a storage destination of the generated image data, and an identifying section that identifies a user who stores the image data, wherein the display section displays, when the user is identified by the identifying section, the selection image corresponding to the identified user, and reduces a number of the selection images to be displayed to be less than a number of all the plural selection images to display the selection image.

18 Claims, 13 Drawing Sheets

FIG. 9
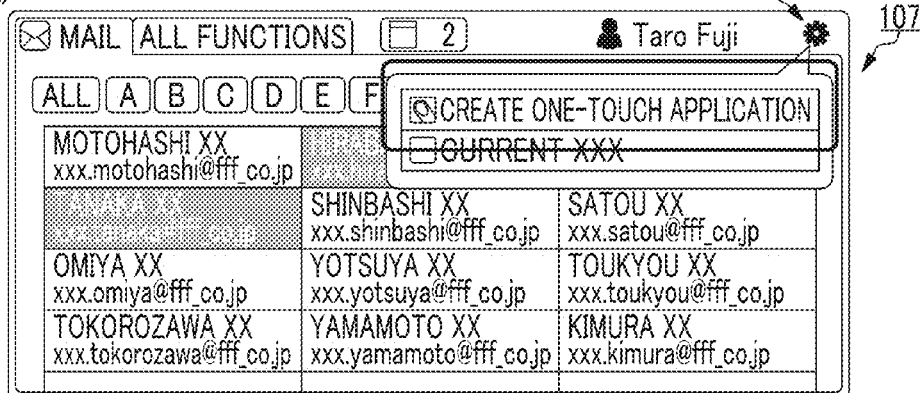
(A)
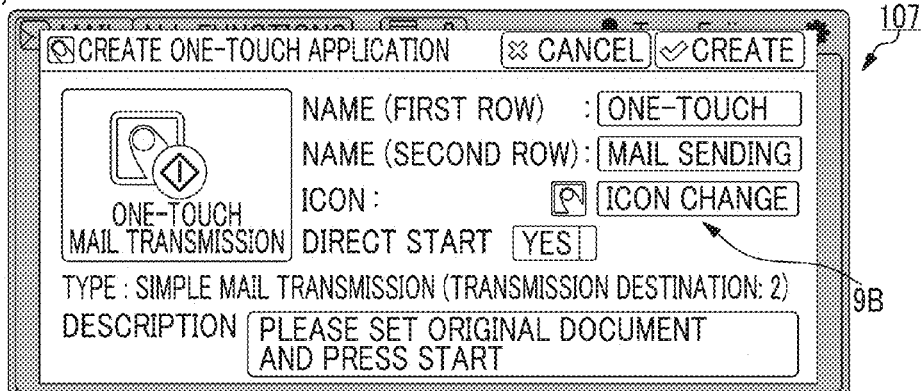
(B)
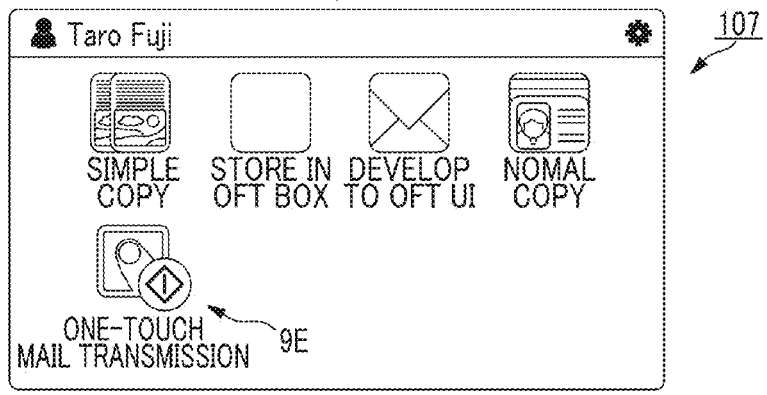
(C)

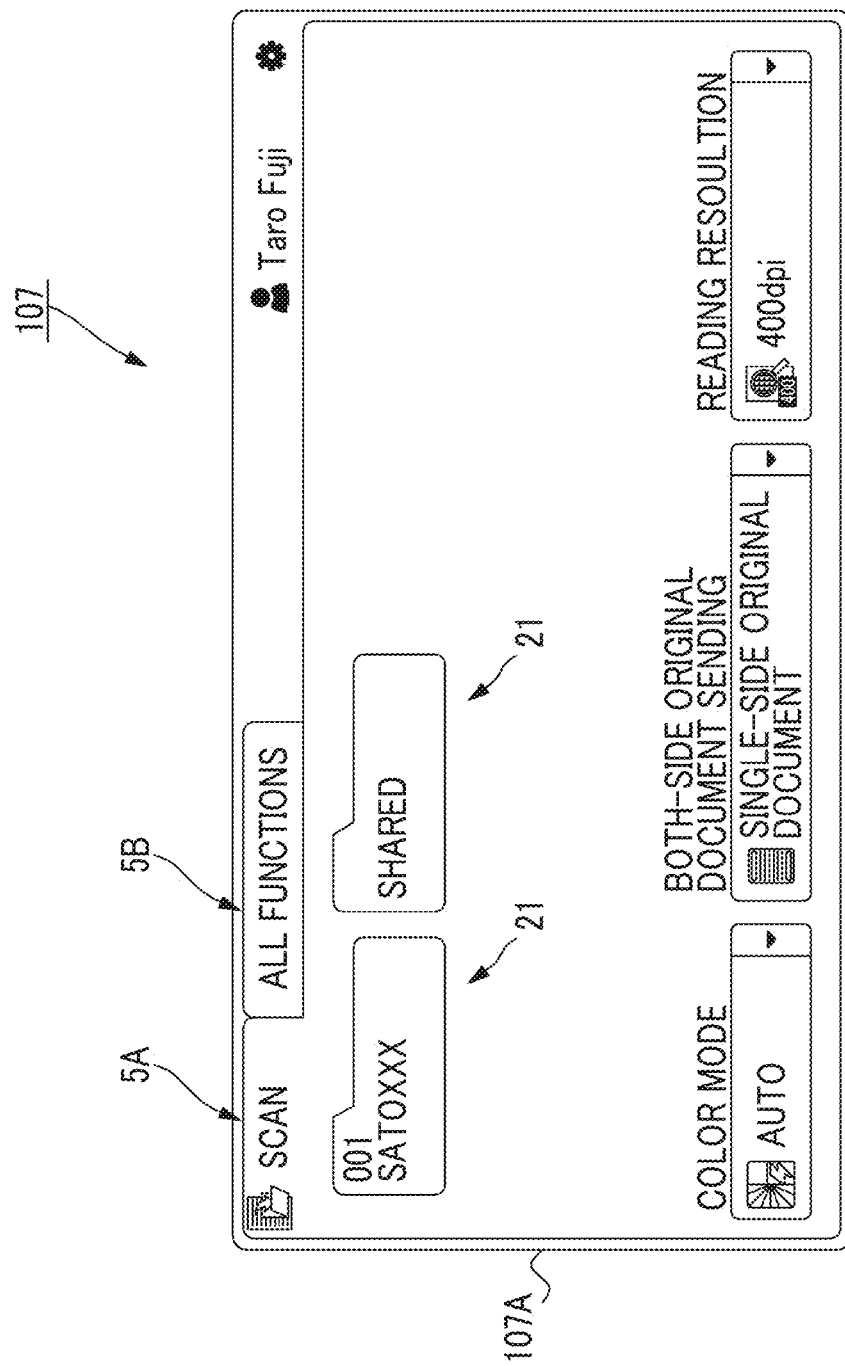

IMAGE READING APPARATUS, DISPLAY APPARATUS, NON-TRANSITORY COMPUTER READABLE RECORDING MEDIUM, AND IMAGE DISPLAYING METHOD

CROSS-REFERENCE TO RELATED APPLICATIONS

This application is based on and claims priority under 35 USC 119 from Japanese Patent Application No. 2013-167136 filed Aug. 9, 2013.

BACKGROUND

Technical Field

The present invention relates to an image reading apparatus, a display apparatus, and a non-transitory computer readable recording medium, and an image displaying method.

SUMMARY

According to an aspect of the invention, there is provided an image reading apparatus including:

an image reading section that reads an image formed on a recording medium to generate image data;

a display section that displays plural selection images that are registered in advance, used in selection of a storage destination of the generated image data; and an identifying section that identifies a user who stores the image data, wherein the display section displays, when the user is identified by the identifying section, the selection image corresponding to the identified user, and reduces a number of the selection images to be displayed to be less than a number of all the plural selection images to display the selection image.

BRIEF DESCRIPTION OF THE DRAWINGS

Exemplary embodiments of the present invention will be described in detail based on the following figures, wherein.

Figure 6:
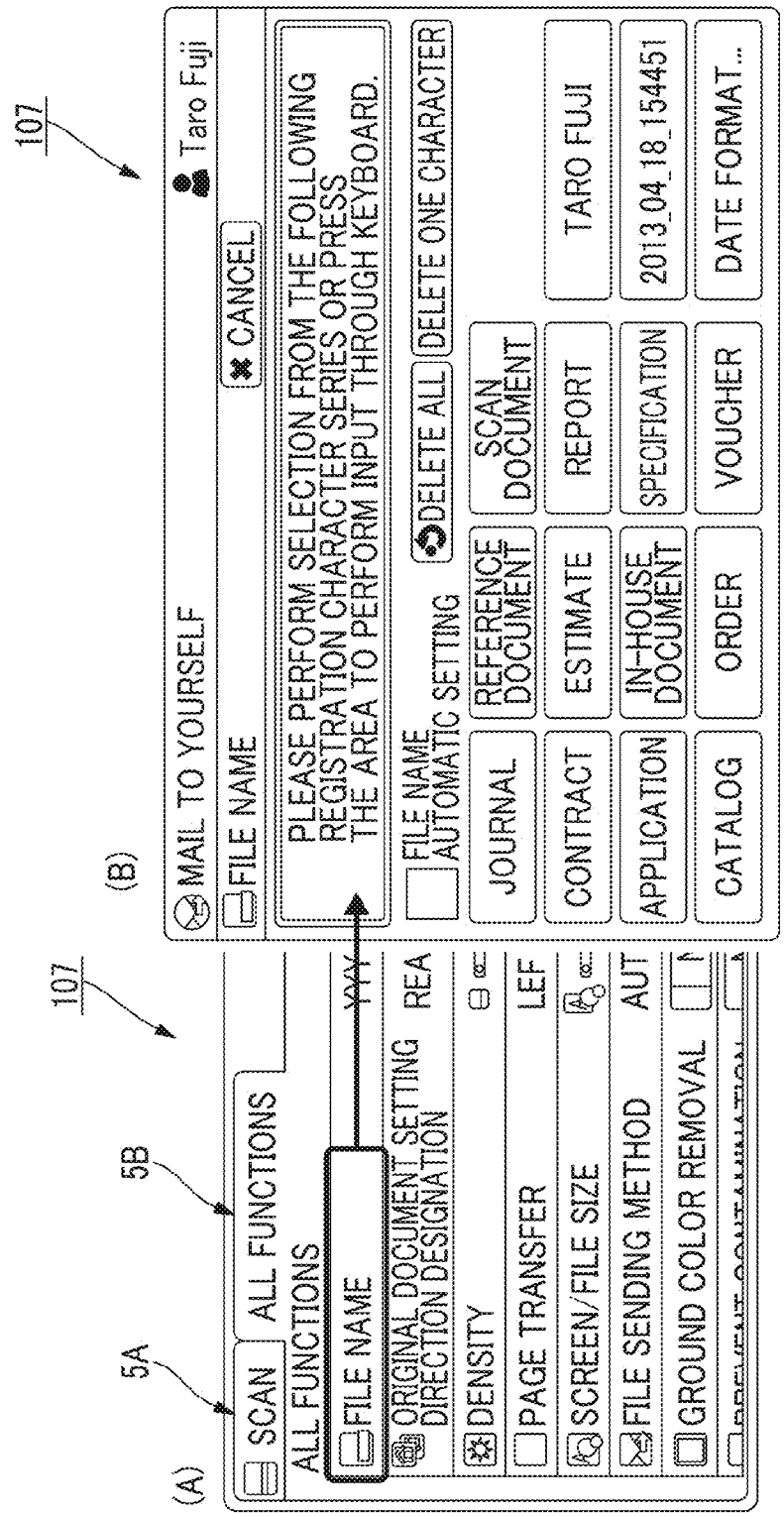
Figure 7:
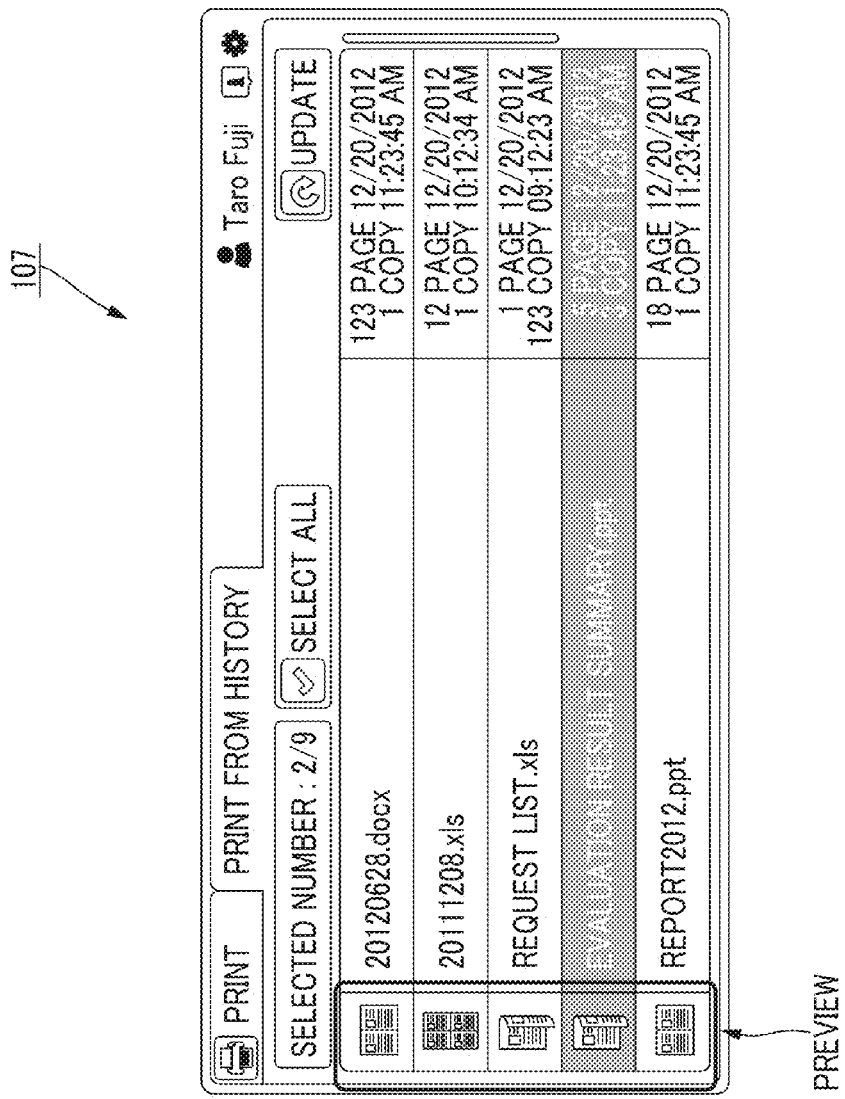
Figure 8:
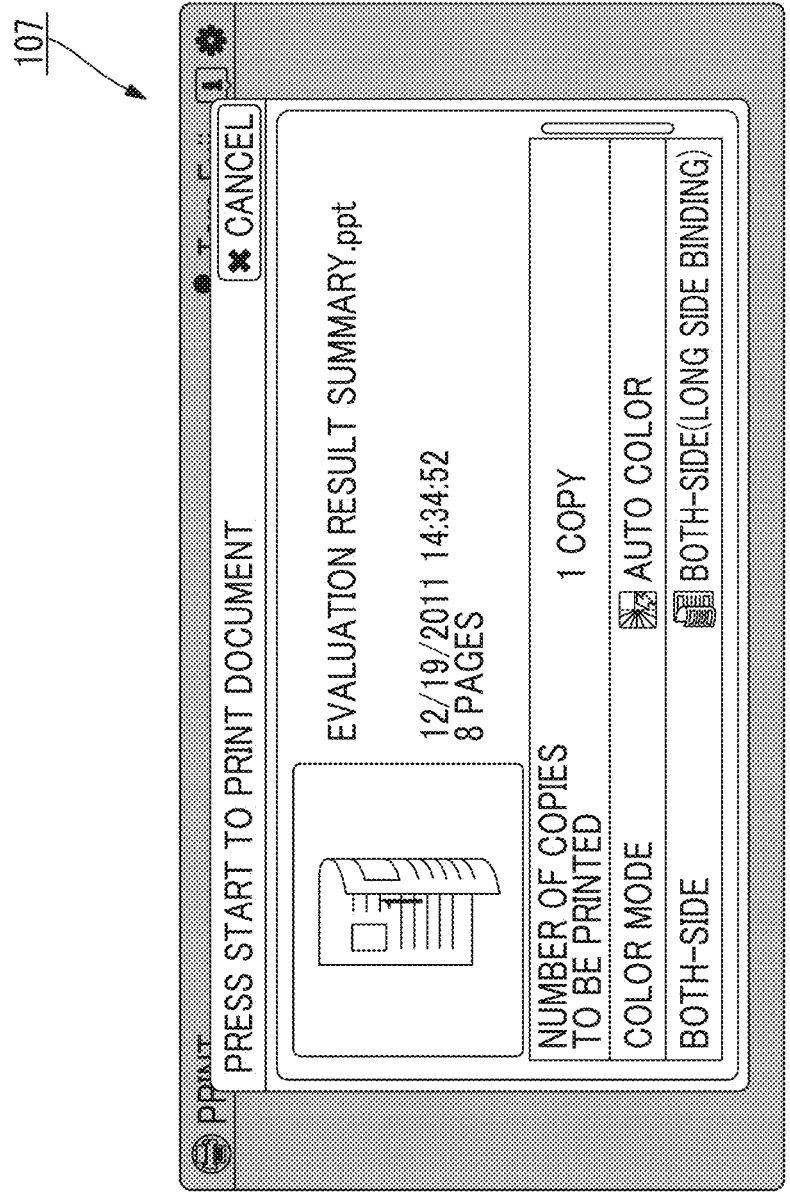
Figure 10:
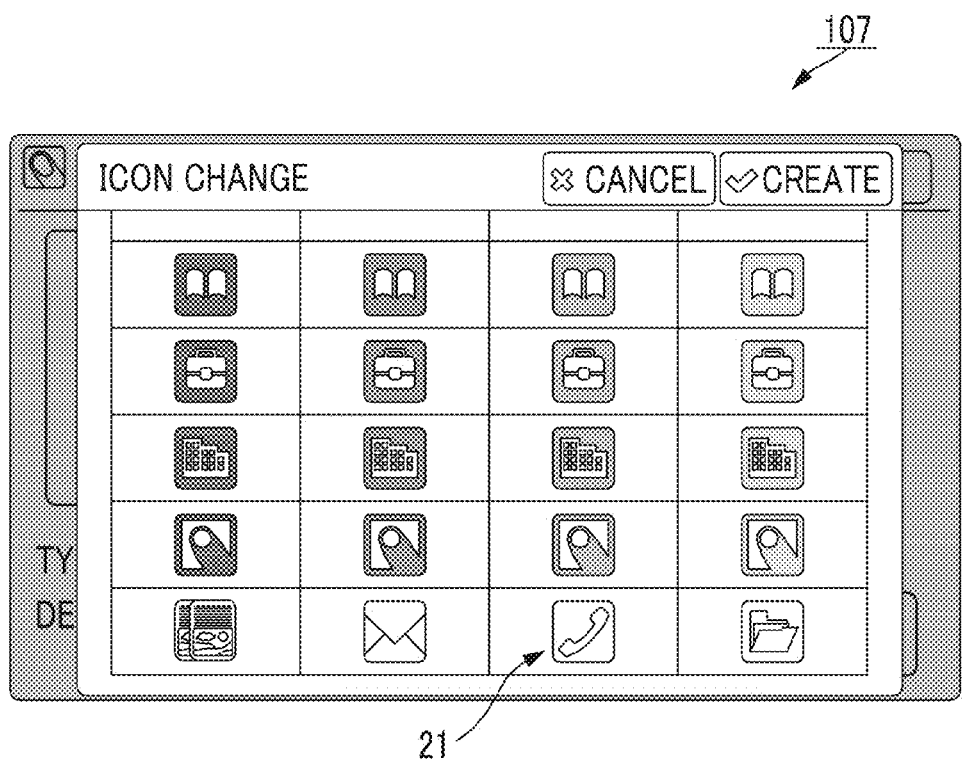
Figure 11A:
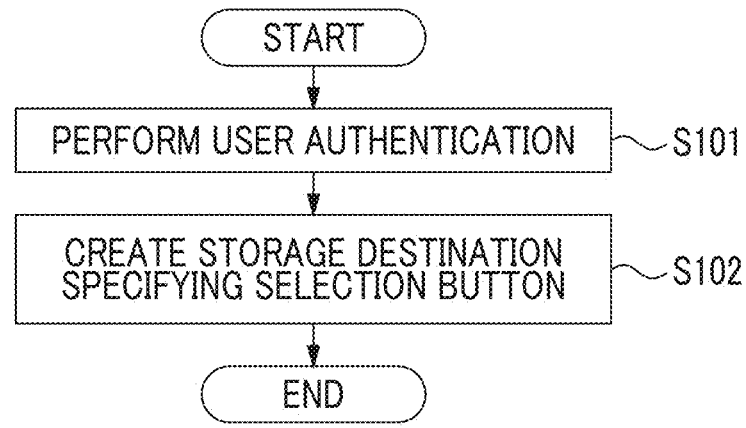
Figure 11B:
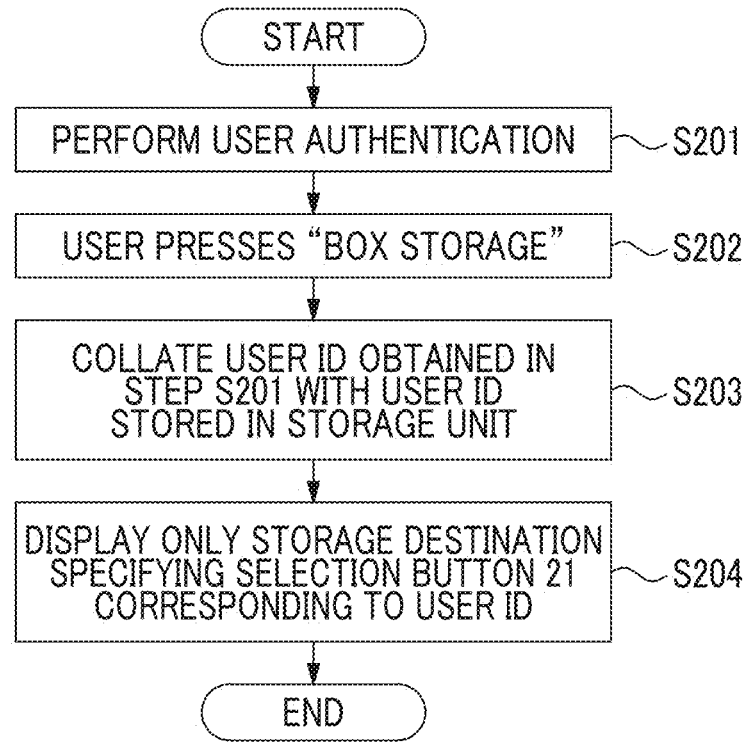
Figure 12:
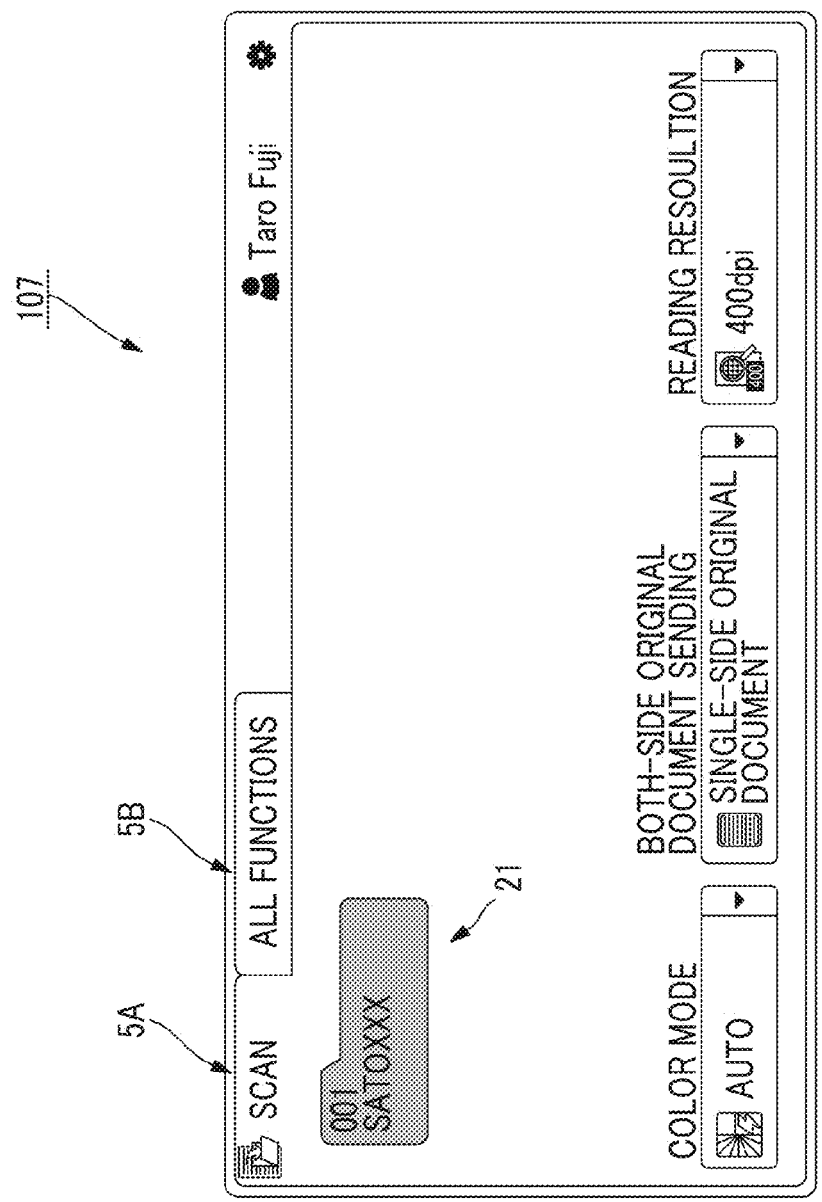

(A) and (B) of FIG. 6 are diagrams illustrating display screens when a second tab is selected;

FIG. 7 is a diagram illustrating a display screen after "personal printing" is selected;

FIG. 8 is a diagram illustrating a display screen after a file is selected;

(A) to (C) of FIG. 9 are diagrams illustrating display screens when a user creates one-touch selection buttons;

FIG. 10 is a diagram illustrating a list of the one-touch selection buttons;

FIG. 11A is a diagram illustrating the flow of a process executed when a storage destination specifying selection button is created by a user, and FIG. 11B is a diagram illustrating the flow of a process executed when box storage is used by the user;

FIG. 12 is a diagram illustrating a display example in a display unit; and

FIG. 13 is a diagram illustrating another display example in a display unit.

DETAILED DESCRIPTION

Hereinafter, exemplary embodiments of the invention will be described with reference to the accompanying drawings.

Figure 1:
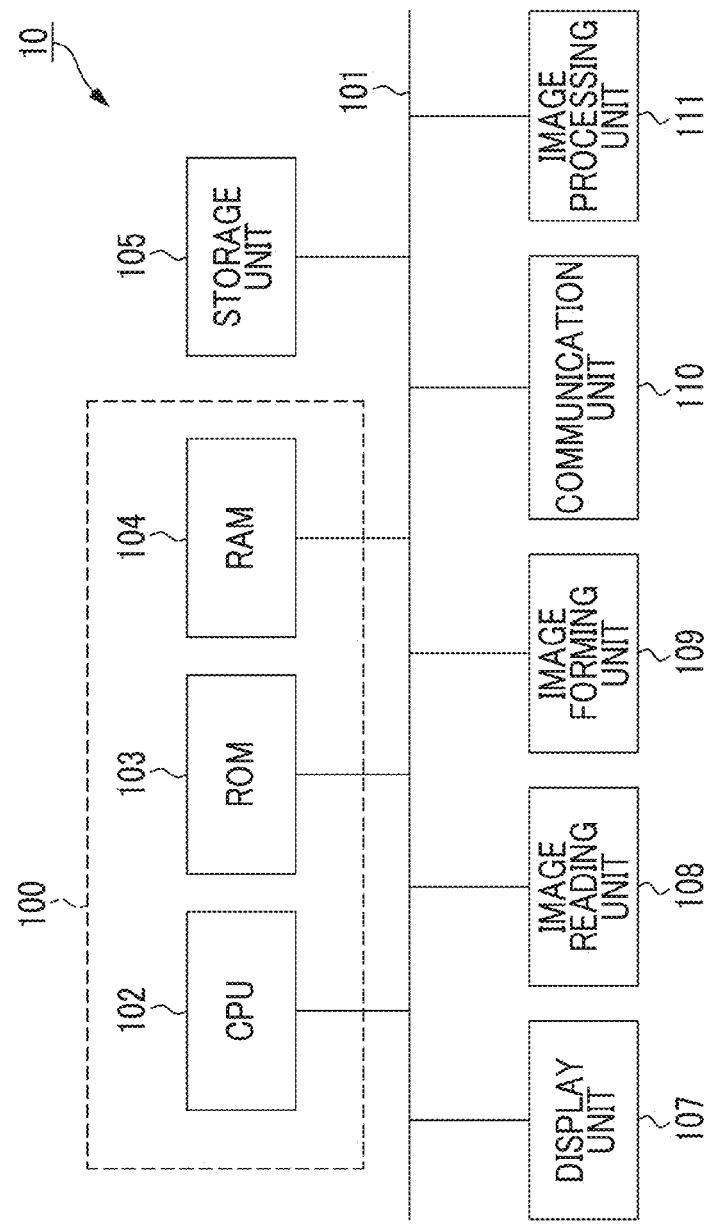
FIG. 1 is a block diagram illustrating a hardware configuration of an image forming apparatus according to an exemplary embodiment of the invention.

FIG. 1 is a block diagram illustrating a hardware configuration of an image forming apparatus 10 according to an exemplary embodiment of the invention. The image forming apparatus 10 of the exemplary embodiment includes a control unit 100, a storage unit 105, a display unit 107, an image reading unit 108, an image forming unit 109, a communication unit 110, and an image processing unit 111. The respective functional units are connected to a bus 101 to perform data exchange through the bus 101.

The control unit 100 controls the respective functional units provided in the image forming apparatus 10. Here, the control unit 100 includes a central processing unit (CPU) 102, a read only memory (ROM) 103, and a random access memory (RAM) 104.

The ROM 103 stores a control program executed by the CPU 102. The CPU 102 reads the control program stored in the ROM 103, and executes the control program using the RAM 104 as an operating area. If the control program is executed by the CPU 102, the respective functional units of the image forming apparatus 10 are controlled. Thus, for example, a predetermined display is performed in the display unit 107, and image formation onto a sheet is performed. Further, reading of an original document set in the image reading unit 108, or the like is performed.

The program executed by the CPU 102 may be provided in a state where the program is stored in a computer readable recording medium such as a magnetic recording medium (magnetic tape, magnetic disk or the like), an optical recording medium (optical disc or the like), a magneto-optical recording medium or a semiconductor memory. Further, the program may be downloaded to the image forming apparatus 10 using a communication unit such as the Internet.

The display unit 107 is formed by a liquid crystal touch panel display, for example, and displays data relating to the image forming apparatus 10, for example, under the control of the control unit 100. Further, the display unit 107 displays a display screen for receiving an operation from a user, and receives the operation from the user through the display screen.

The image reading unit 108 includes an image reader (scanner) that reads a document to generate image data indicating an image of the document, and outputs the generated image data to the image processing unit 111.

The image forming unit 109 has an image forming mechanism that forms a toner image based on the image data, for example, on a sheet that is a recording medium by an electrophotographic technique or the like.

The communication unit 110 is connected to a communication line (not shown), and functions as a communication interface that performs communication with a different device connected to the communication line.

The image processing unit 111 performs image processing such as color correction, gradation correction and the like for the input image data, and generates image data subjected to the image processing to output the image data to the image forming unit 109.

The storage unit 105 includes a memory such as a hard disk drive, and for example, stores data received through the communication unit 110 or data generated in the image forming apparatus 10.

Figure 2:
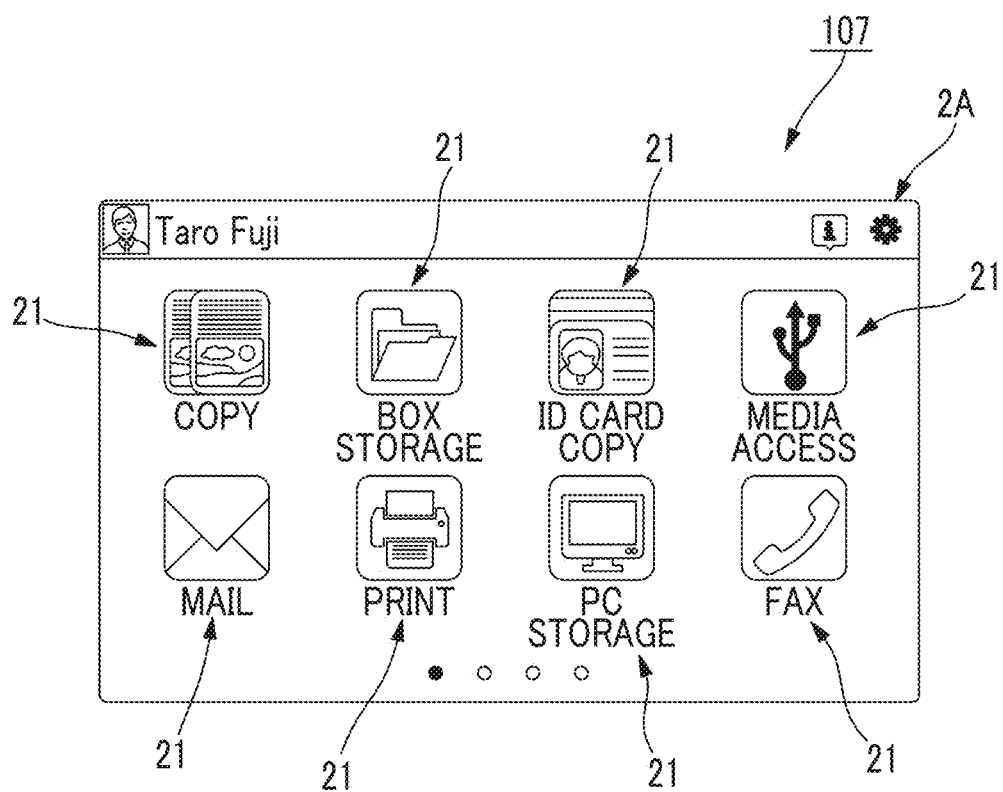
FIG. 2 is a diagram illustrating a display example in a display unit.

FIG. 2 is a diagram illustrating a display example in the display unit 107.

A home screen shown in FIG. 2 is normally displayed in the display unit 107. On the home screen, plural selection buttons (icons) 21 are displayed. As any one button of the selection buttons 21 is selected (pressed) by a user, a function corresponding to the selected selection button 21 is executed.

Specifically, in the example shown in FIG. 2, as the selection buttons 21, selection buttons 21 for selecting any one of "copy", "box storage", "ID card copy", "media access", "mail", "print", "PC storage" and "fax" are displayed. Further, in the exemplary embodiment, if the user selects any one of these selection buttons 21, a screen for performing detailed setting is then displayed. Then, if a predetermined button such as a start button is pressed by the user, a process such as copy is started.

The home screen of the exemplary embodiment is configured by plural pages, and is switched to another page by drawing a "ground" portion (background portion) on the display screen shown in FIG. 2 in a left direction in the figure while pressing the "ground" portion with a finger. Additionally, in the exemplary embodiment, the page switching is performed by a so-called flick operation. If the page switching is performed, different selection buttons 21 appear.

Further, in the display unit 107 of the exemplary embodiment, each of the selection buttons 21 is movable according to an operation. Specifically, by moving a finger in a state where the selection button 21 is pressed by the finger, it is possible to move the selection button 21. In other words, in the exemplary embodiment, the movement of the selection button 21 is performed by drag-and-drop.

Further, in the exemplary embodiment, if the selection button 21 is continuously pressed for a predetermined time, or if a gear-shaped symbol (symbol indicated by reference numeral 2A) positioned in an upper right part of the screen is pressed in a state where any one of the selection buttons 21 is selected, the screen is switched, so that detailed setting of functions associated with the selected selection button 21 may be performed.

Figure 3:
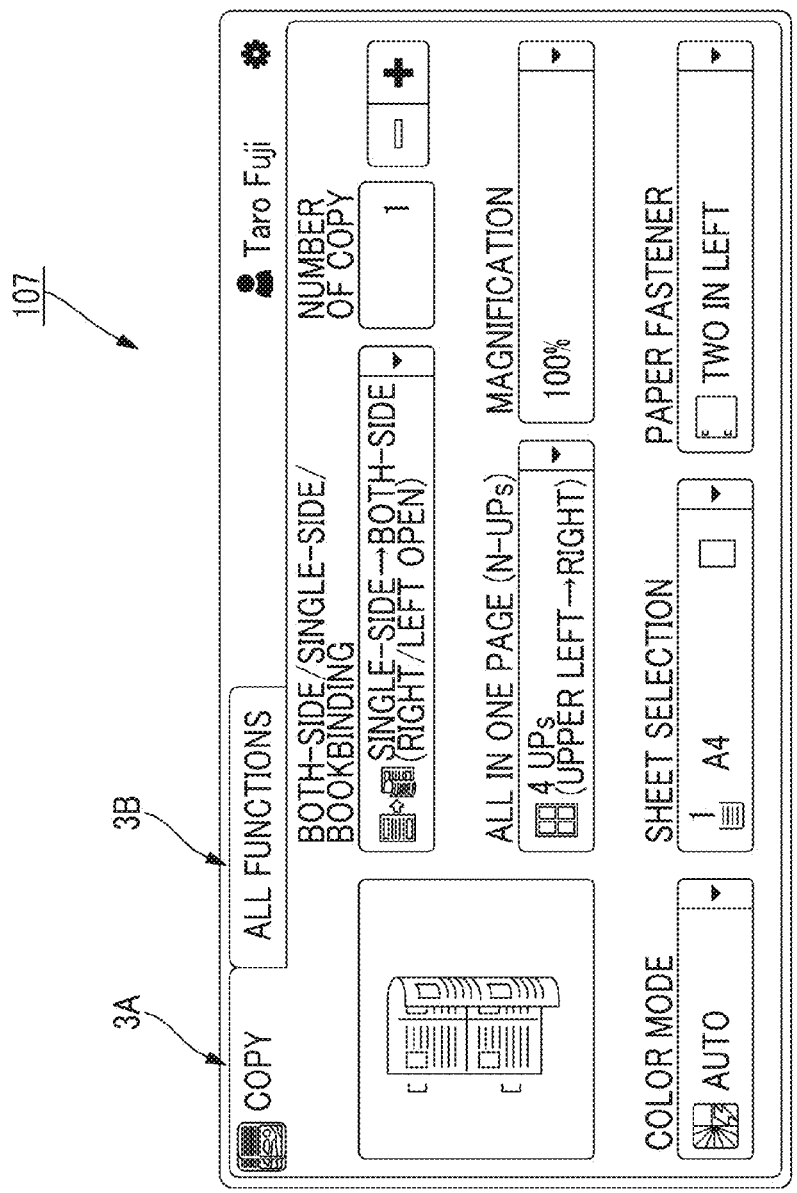
FIG. 3 is a diagram illustrating a display screen after a "copy" selection button shown in FIG. 2 is selected by a user.

FIG. 3 is a diagram illustrating a display screen after the "copy" selection button 21 shown in FIG. 2 is selected (pressed) by a user.

On this display screen, two tabs (hereinafter, referred to as a "first tab 3A" and a "second tab 3B") are provided as indicated by reference numerals 3A and 3B. If only two tabs are present in this way, a button (button to be operated) necessary for a user is present in any one tab. Then, if the tab is moved once, the necessarily necessary buttons are present, and thus, it is possible to reduce the number of times of the movement of the tab until the user selects a tab in which a necessary button (button to be operated) is present, compared with a case where there are three or more tabs, for example, four, five or the like.

In other words, if there are many tabs, it is difficult to recognize a matching relationship between the tabs and their functions. However, as in the exemplary embodiment, if only two tabs are present, it is easy to recognize the matching relationship between the tabs and their functions.

Here, in a state where the first tab 3A is selected, as shown in FIG. 3, setting items such as "both-side/single-side/book-binding", "the number of copies", "the number of N-ups (the number of pages integrated in one page)", "magnification", "color mode", "sheet selection" and "paper fastener" are displayed. In other words, in the exemplary embodiment, on the display screen when the first tab 3A is selected, setting items considered to have a relatively high frequency of change by the user are displayed.

Figure 4:
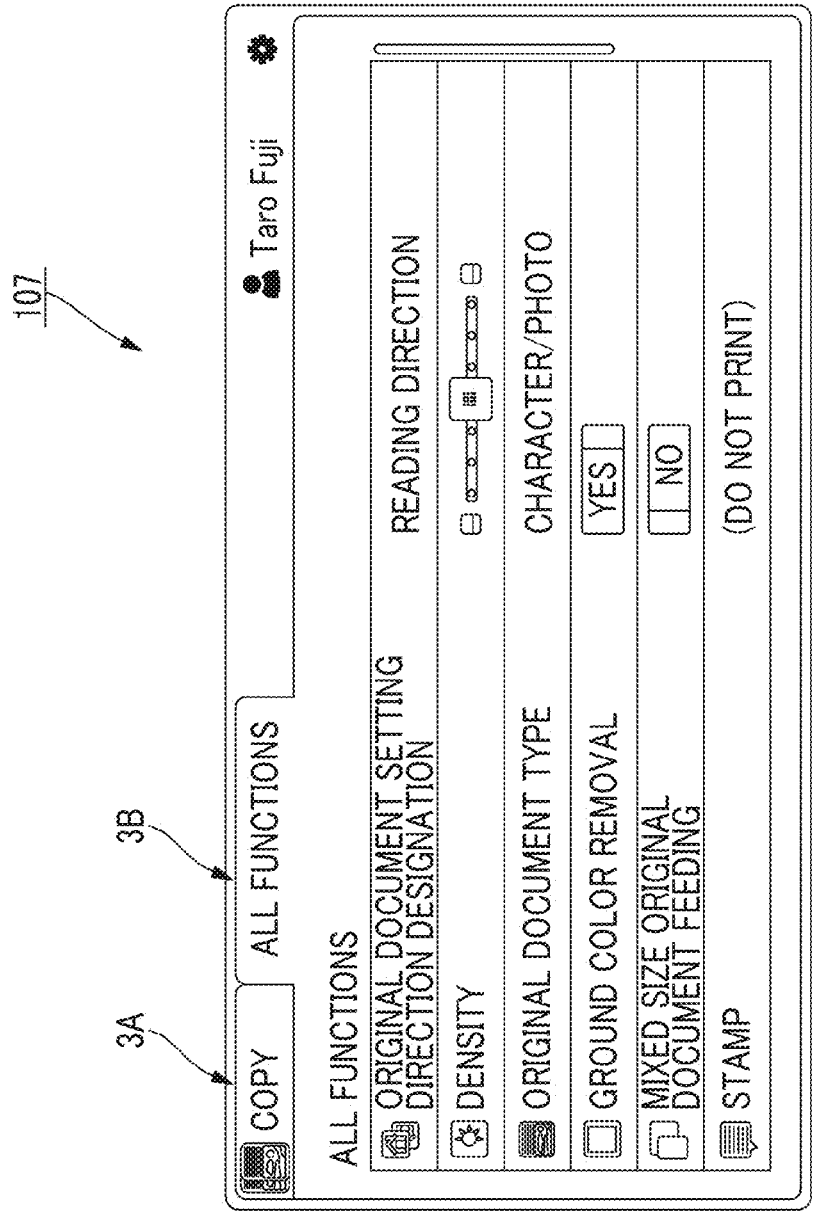
FIG. 4 is a diagram illustrating a display example in the display unit.

On the other hand, in the exemplary embodiment, with respect to setting items considered to have a relatively low frequency of change by the user, as shown in FIG. 4 (illustrating a display example in the display unit 107), the display is performed by a display screen when the second tab 3B is selected.

Here, on the display screen shown in FIG. 4, the respective setting items (respective items that are to be set by the user) are arranged in a longitudinal direction of the screen to be displayed. In other words, the setting items are displayed in a list form. On the display screen shown in FIG. 4, hidden setting items are also displayed by performing scroll downward in the figure.

Here, on the display screen when the second tab 3B is selected, other setting items are also displayed by performing scroll in one direction (downward in the figure). Thus, the user may easily find a setting item that the user is looking for.

Here, for example, it may be considered that the respective setting items are displayed in a button form and are arranged in a lattice form. In this case, the user should move the user's sight line in a longitudinal direction and in a transverse direction as necessary. In this case, it is difficult for the user to find the setting item that the user is looking for, compared with the case where the setting items are displayed by performing scroll in one direction as in the exemplary embodiment.

Figure 5:
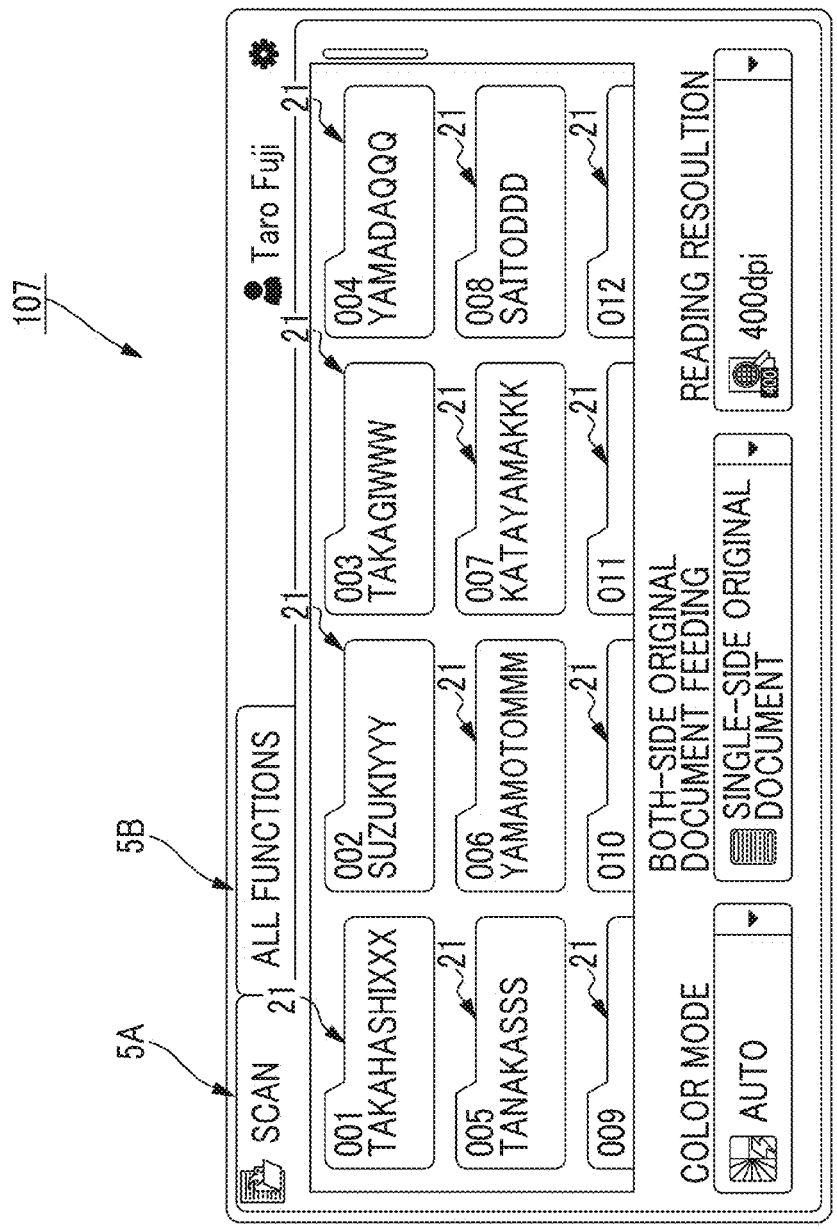
FIG. 5 is a diagram illustrating a display screen when "box storage" on a home screen shown in FIG. 2 is selected.

FIG. 5 is a diagram illustrating a display screen when the "box storage" on the home screen shown in FIG. 2 is selected.

If the "box storage" on the home screen is selected, as shown in FIG. 5, the screen is switched to a display screen in which plural selection buttons 21 that are given user names are displayed. On this display screen, similarly to the previous display screen, two tabs (hereinafter, referred to as a "first tab 5A" and a "second tab 5B") are provided.

FIG. 5 shows a state where the first tab 5A is selected. Further, in the exemplary embodiment, if the "box storage" is selected and the display screen is switched, first, the first tab 5A is displayed. Further, in the exemplary embodiment, as the user separately selects the second tab 5B, a display screen corresponding to the second tab 5B is displayed.

Here, the box storage refers to a process of storing the image data generated by reading the original document using the image reading unit 108 (see FIG. 1) in the storage unit 105. Here, if any one of the selection buttons 21 shown in FIG. 5 is selected by the user, a storage destination is designated, and the image data is stored in the storage destination.

Until the storage destination is selected, all the respective selection buttons 21 shown in FIG. 5 enter an off state (of approximately the same color as the color of "ground"), and if the storage destination is selected, the buttons are switched to a different color to enter an on-state (selected state).

Further, on the display screen shown in FIG. 5, setting items ("color mode", "original document feeding mode" and "reading resolution") having a high change frequency from the user are displayed at the lowermost part of the screen. With respect to the setting items, the content thereof may be changed without performing screen switching (without selecting the second tab 5B).

(A) and (B) of FIG. 6 are diagrams illustrating display screens when the second tab 5B is selected.

As shown in (A) of FIG. 6, when the second tab 5B is selected, other setting items capable of being set in the box storage are displayed. In this case, the respective setting items may be displayed in a list form, similarly to the above description. Here, in the exemplary embodiment, a file name is given to each original document that is read by the image reading unit 108. Further, in the exemplary embodiment, if the setting item of "file name" shown in (A) of FIG. 6 is selected, a file name input display screen is displayed as shown in (B) of FIG. 6. In the exemplary embodiment, the user inputs a desired file name through the display screen.

Next, personal printing will be described.

In the personal printing, image data generated by a personal computer (PC) or the like of a user is transmitted to the image forming apparatus 10, and is temporarily stored in the storage unit 105 (see FIG. 1) of the image forming apparatus 10. Further, as the user inputs a start instruction through the display unit 107, image formation onto the sheet is started.

In the personal printing, since the image formation is performed in a state where the user is present in the vicinity of the image forming apparatus 10, the user may obtain a printed matter immediately after the printed matter is output. In this case, it is difficult for a person other than the user to obtain the printed matter.

Here, when the personal printing is performed, the home screen shown in FIG. 2 is operated, and a "personal printing" selection button (not shown in FIG. 2) is selected by the user. Then, if the "personal printing" selection button is selected, the screen is switched to a display screen shown in FIG. 7 (that is a diagram showing a display screen after the "personal printing" is selected).

Here, on the display screen after switching shown in FIG. 7, file names of plural pieces of image data (printing jobs) stored in the storage unit 105 are displayed in a list form. In other words, the respective file names are displayed in a state of being arranged in the longitudinal direction. Further, on a left side of the file name in the figure, a preview screen indicating a state of a sheet after printing is displayed.

Here, if one of the plural files shown in FIG. 7 is selected, the screen is switched to a screen shown in FIG. 8 (that is a diagram showing a display screen after the file is selected). Here, on this display screen, setting items are displayed at a lower half part of the screen. Specifically, in this example, three setting items of "the number of copies", "color mode" and "both-side printing" are displayed.

Further, the file name is displayed at an upper right part of the display screen, and the preview screen indicating the state of the sheet after printing is displayed at an upper left part of the display screen. In the exemplary embodiment, each of the three setting items may be changed on the display screen shown in FIG. 8. If any setting item is changed, the preview screen is also changed according to the change. That is, in the exemplary embodiment, the preview screen is dynamically changed according to the change of the setting item.

Here, in the exemplary embodiment, as described above, the files are displayed in the list form in this way, and then, the user selects a desired file to be printed. Then, the selected file is printed.

Although not shown, in the exemplary embodiment, a "personal batch printing" selection button 21 is also prepared on the home screen, and if this selection button 21 is pressed, accumulated documents that are not yet output are printed in a batch by one-touch (without performing a different input operation). In other words, in the exemplary embodiment, two types of selection buttons 21 of "personal printing (list display)" and "personal batch printing" are prepared with respect to the personal printing.

However, in the image forming apparatus 10 of the exemplary embodiment, in addition to the selection buttons 21 that are prepared in advance, a new selection button 21 may be created by the user. In other words, in the exemplary embodiment, it is possible to create the selection button 21 (hereinafter, referred to as a "one-touch selection button 21") through which the process is started by performing selection of the selection button 21 once (by performing the input operation once instead of performing the input operation plural times). The "personal batch printing" selection button 21 corresponds to the one-touch selection button 21.

Here, when the user creates the one-touch selection button 21, a gear-shaped symbol (symbol indicated by reference numeral 9A) positioned at an upper right part in (A) of FIG. 9 (that is a diagram illustrating a display screen when the user creates the one-touch selection button 21) is pressed by the user. The display screen shown in (A) of FIG. 9 displays a screen in mail transmission. In other words, (A) of FIG. 9 shows a state after the "mail" selection button 21 shown in FIG. 2 is selected so that the display screen is switched.

Here, if the gear-shaped symbol is pressed, a display screen shown in (B) of FIG. 9 is displayed. Here, on this display screen, information necessary for the creation of the one-touch selection button 21 is input by the user. Specifically, a name (first row) and a name (second row) are input by the user. Here, in the one-touch selection button (one-touch selection button 21 after creation) of the exemplary embodiment, the names are displayed in two stages. The "name (first row)" represents a name displayed in the upper stage among two stages, and the "name (second row)" represents a name displayed in the lower stage among two stages.

Further, on the display screen shown in (B) of FIG. 9, a button (see reference numeral 9B) to be pressed by the user when changing a symbol of the one-touch selection button 21 (icon) is also displayed. If this button is pressed by the user, a screen shown in FIG. 10 (that is a diagram illustrating a list of the one-touch selection buttons 21) is displayed. Here, if the user selects one one-touch selection button 21 from the screen, the selected one one-touch selection button 21 is registered as a new one-touch selection button 21. Further, in the exemplary embodiment, the user may register an explanation. When registration of the explanation is desired, the user inputs the explanation in a box positioned at a lower part of the display screen (display screen shown in (B) of FIG. 9).

Here, if the user's input for the display screen shown in (B) of FIG. 9 is finished, the user presses a "create" button positioned at an upper right part in the figure. Thus, the display is switched into a display screen shown in (C) of FIG. 9, and a "one-touch mail transmission" one-touch selection button 21 is added on the display screen (on the home screen).

Hereinbefore, the process of creating the one-touch selection button 21 is described. However, in the exemplary embodiment, the user may create the selection button 21 for displaying a confirmation screen after selecting the selection button 21 and for executing the process by inputting a start button. The one-touch selection button 21 and the normal selection button 21 are formed to be distinguished from each other on the display screen. As indicated by reference numeral 9E in (C) of FIG. 9, a diamond-shaped mark is added to the one-touch selection button 21. In the exemplary embodiment, the start button for executing the process after the confirmation screen is displayed is disposed in a different place (not shown) of the image forming apparatus, instead of the display screen.

In the above description, the display process in the image forming apparatus 10 is described, but the display process may be similarly performed in a device (device such as a tablet terminal, for example) other than the image forming apparatus 10.

Here, the box storage described in FIG. 5 will be further described.

When the user uses the function of box storage, first, it is necessary to create a user's own selection button 21 (a selection button 21 for specifying a storage destination, which is hereinafter referred to as a "storage destination specifying selection button 21") on the display screen shown in FIG. 5. Here, first, an example of a process executed when the user creates the storage destination specifying selection button 21 will be described.

FIG. 11A is a diagram illustrating the flow of a process executed by the control unit 100 when the storage destination specifying selection button 21 is created by the user.

When the user creates the storage destination specifying selection button 21, first, a user authentication of determining whether the user has authority to use the image forming apparatus 10 is performed (step 101). The user authentication is performed when the user starts using the image forming apparatus 10 (when the operation of the image forming apparatus 10 is started).

Here, the user authentication is performed by collating a user ID (identification information for identifying the user among other users) input by the user through a numeric keypad (not shown) or the display unit 107 with a user ID that is stored in advance in the storage unit 105 (FIG. 1) of the image forming apparatus 10 or the like.

The user authentication may be performed by collating a user ID read from an ID card (not shown) carried by the user with the user ID stored in the storage unit 105 of the image forming apparatus 10 or the like. Further, here, an example in which one user ID that is a comparison object is stored in the storage unit 105 is described, but the user ID may be stored in an external device such as a server. In this case, the user ID stored in the external device is compared with the user ID (user ID obtained from the user) obtained by the image forming apparatus 10.

Further, if it is determined by the user authentication that the user has the authority, the control unit 100 creates the storage destination specifying selection button 21 for the user (step 102).

In creation of the storage destination specifying selection button 21, the control unit 100 displays a display screen for receiving user information in the display unit 107 to obtain the user information such as a user name. Further, the control unit 100 generates button identification information used for identification of a storage destination specifying selection button 21 to be created at this time and another storage destination specifying selection button 21 that is already created.

Further, the control unit 100 obtains the user ID of the user. The control unit 100 obtains the user ID based on the information input by the user through the numeric keypad or the like in step 101.

Further, the control unit 100 stores the obtained user information, the generated button identification information and the obtained user ID in the storage unit 105 in association therewith. As shown in FIG. 5, since the storage destination specifying selection buttons 21 for plural different users are normally created, the user information, the button identification information and the user IDs corresponding to the plural users are stored in the storage unit 105.

Next, the flow of a process executed when the box storage is used by the user will be described with reference to FIG. 11B. Although not shown in the above description, in the exemplary embodiment, when the box storage is used, the authentication process is performed using the user ID, and only the user who has the authority may use the box storage.

When the user uses the box storage, first, selection of the "box storage" on the home screen shown in FIG. 2 is performed by the user. However, here, before the selection, in the exemplary embodiment, the user authentication is performed by the control unit 100 that functions as an identifying section (step 201). In other words, in the exemplary embodiment, when the user starts using the image forming apparatus 10, the user authentication is executed, as described above. The user authentication is performed by collating the user ID obtained by the control unit 100 that functions as an obtaining section with the user ID stored in the storage unit 105 of the image forming apparatus 10 or the like, as described above.

Further, if the user authentication is finished (it is determined that the user has the authority) and the user desires the box storage, the "box storage" on the home screen (see FIG. 2) is pressed by the user (step 202). Then, the control unit 100 collates the user ID obtained in step 201 (user ID obtained in the user authentication) with the plural user IDs stored in the storage unit 105 (step 203). In other words, it is determined whether the user ID obtained in step 201 is present in the plural user IDs stored in the storage unit 105.

Further, if the user ID obtained in step 201 is present in the plural user IDs stored in the storage unit 105, the control unit 100 that functions as a part of a display section displays only the storage destination specifying selection button 21 corresponding to the user ID in the display unit 107 (that is, only one storage destination specifying selection button 21), as shown in FIG. 12 (that is a diagram illustrating a display example of the display unit 107) (step 204). In this display, inside the outer periphery of the storage destination specifying selection button 21 (box), the user information (user name) input by the user when the storage destination specifying selection button 21 is created is also displayed.

Here, if only one storage destination specifying selection button 21 is displayed in this way, compared with a case where the plural storage destination specifying selection buttons 21 are displayed (compared with the display example shown in FIG. 5), a probability that the storage destination specifying selection button 21 is mistakenly pressed decreases.

Further, if only one storage destination specifying selection button 21 is displayed as in the exemplary embodiment, a storage destination specifying selection button 21 of another user is not displayed. In such a case, a user name of another user who uses the image forming apparatus 10 is concealed from being known to the user who uses the box storage, and thus, security performance is improved.

Further, if only one storage destination specifying selection button 21 is displayed, compared with the case where the plural storage destination specifying selection buttons 21 are displayed (see FIG. 5), a user's working time necessary for selection (specification) of the storage destination specifying selection button 21 decreases.

In the exemplary embodiment, an example in which only one storage destination specifying selection button 21 is displayed is described, but as long as the storage destination specifying selection button 21 of the user specified by the user ID obtained in step 201 may be included, plural storage destination specifying selection buttons 21, for example, two or three may be displayed.

In other words, the invention is not limited to the case where one storage destination specifying selection button 21 is displayed, and as long as the storage destination specifying selection buttons 21 that are smaller in number than the number of all the users who use the box storage are displayed, user's options for selecting the storage destination specifying selection button 21 decrease, to thereby reducing a problem such as accidental pressing of the storage destination specifying selection button 21.

Further, in the exemplary embodiment, only one storage destination specifying selection button 21 is not merely displayed, and the storage destination specifying selection button 21 is moved from the original arrangement position (arrangement position when the storage destination specifying selection buttons 21 of all the users are displayed (see FIG. 5)) to be arranged to an upper left corner on the display screen, as shown in FIG. 12. In other words, the storage destination specifying selection button 21 is displayed on the uppermost and leftmost side of the display screen. Thus, the user may quickly find the user's own storage destination specifying selection button 21.

More specifically, in the exemplary embodiment, the arrangement position of one storage destination specifying selection button 21 in a display mode where the storage destination specifying selection buttons 21 of all the users are displayed is different from the arrangement position of one storage destination specifying selection button 21 in a display mode where only one storage destination specifying selection button 21 is displayed (display mode where the number of the displayed storage destination specifying selection buttons 21 is reduced).

Here, for example, even when only one storage destination specifying selection button 21 is displayed, if the storage destination specifying selection button 21 is disposed at the original position without movement, the storage destination specifying selection button 21 may not be found unless a scroll is performed.

More specifically, in the exemplary embodiment, if the plural storage destination specifying selection buttons 21 are present, as shown in FIG. 5, if the display screen is not scrolled downward using a scroll bar positioned on the right side of the display screen, hidden storage destination specifying selection buttons 21 are not displayed, and thus, all storage destination specifying selection buttons 21 may not be confirmed. In such a case, if the movement of the storage destination specifying selection buttons 21 is not performed, the storage destination specifying selection buttons 21 are present in the hidden state.

The display screen shown in FIG. 12 will be further described.

In the exemplary embodiment, as shown in FIG. 12, when only one storage destination specifying selection button 21 is displayed, the color of the one storage destination specifying selection button 21 is made different from the color of "ground" in the display unit 107 to be displayed in an on-state. In other words, in a state where one storage destination specifying selection button 21 is already selected, the one storage destination specifying selection button 21 is displayed. In this case, the user may start the box storage without performing the selection of the one storage destination specifying selection button 21 (without contacting with the one storage destination specifying selection button 21).

The box storage is started when a start button (not shown) is pressed by the user. Here, if the start button is pressed, the image reading unit 108 that functions as an image reading section is operated, so that reading of the original document (recording medium) set in the image reading unit 108 is started. Thus, an image on the original document is read to generate image data, and then, the image data is stored in the storage unit 105.

Then, the user accesses the storage unit 105, and thus, reading of the image data from the storage unit 105 is performed. Further, the image data is output to the image forming unit 109, the communication unit 110 or the like. Thus, image formation onto a sheet, facsimile transmission, data transfer to the outside or the like is performed.

In the above description, an example in which only one storage destination specifying selection button 21 is displayed is described, but when a storage destination specifying selection button 21 shared by plural users is created, as shown in FIG. 13 (that is a diagram illustrating another display example of the display unit 107), in addition to the one storage destination specifying selection button 21 (hereinafter, referred to as a "personal selection button 21"), the shared storage destination specifying selection button 21 (hereinafter, referred to as a "shared selection button 21") is displayed.

Here, on the display screen shown in FIG. 13, since it is not clear which one of the personal selection button 21 and the shared selection button 21 is selected by the user, both of the personal selection button 21 and the shared selection button 21 are displayed in an off-state (displayed with the same color as in the "ground").

Further, on the display screen shown in FIG. 13, the personal selection button 21 is disposed at an upper left corner on the screen, and the shared selection button 21 is adjacently disposed at the right of the personal selection button 21. In other words, in the exemplary embodiment, the personal selection button 21 is arranged adjacent to one side edge 107A among four side edges (sides) of the display screen formed in a rectangular shape, and the shared selection button 21 is arranged on a side (on a central side of the display region) opposite to one side edge 107A with the personal selection button 21 being interposed therebetween.

More specifically, in the exemplary embodiment, as shown in FIGS. 12 and 13, regardless of the presence or absence of the shared selection button 21, the personal selection button 21 is arranged at a certain position (upper left corner). In this case, it is easier for the user to find the user's own selection button 21 (personal selection button 21).

When the shared selection button 21 is displayed, if the shared selection button 21 is displayed in the upper left corner, the position of the personal selection button 21 is changed according to the presence or absence of the shared selection button 21. In such a case, compared with a case where the personal selection button 21 is arranged at the certain position, it is difficult for the user to find the user's own selection button 21.

In the above description, the image forming apparatus 10 having the user authentication function is described, but when the box storage is used in a state where the user authentication function is turned off, or when the box storage is used by the image forming apparatus 10 that does not have the user authentication function, all the selection buttons 21 are displayed, and the display screen in the display unit 107 is provided as shown in FIG. 5. On the display screen, as shown in FIG. 5, user names of other users who use the box storage are also displayed.

On the other hand, in the image forming apparatus 10 having the user authentication function in which the user authentication function is turned on, two different processes are executed according to whether the user authentication is performed or not (whether the user has the authority or not). Here, when the user authentication is performed, as described above, one storage destination specifying selection button 21 (personal selection button 21) corresponding to the user, or the one storage destination specifying selection button 21 (personal selection button 21) and the shared storage destination specifying selection button 21 (shared selection button 21) are displayed.

On the other hand, when the user authentication fails (when the user authentication in step 201 in FIG. 11B is not successful), or when the user authentication is not performed, in the exemplary embodiment, the display of the storage destination specifying selection button 21 on the display screen is not performed at all. Thus, the box storage from a user who does not have the authority is prevented. Further, in this case, the user name of the user who uses the box storage is also prevented from being known to the user who does not have the authority.

The image forming apparatus 10 of the exemplary embodiment has the user authentication function, as described above. Further, in the image forming apparatus 10 of the exemplary embodiment, the display mode is switched according to the turning on/off of the user authentication function. More specifically, when the user authentication function is turned on, a first display mode is realized, and when the user authentication function is turned off, a second display mode is realized.

Here, in the first display mode, as described above, the display of one storage destination specifying selection button 21 or the non-display of the storage destination specifying selection button 21 is performed. More specifically, when the user authentication is performed, one storage destination specifying selection button 21 is displayed, and when the user authentication is not performed, the storage destination specifying selection button 21 is not displayed. Further, in the second display mode, all the storage destination specifying selection buttons 21 (storage destination specifying selection buttons 21 corresponding to the number of all users who use the box storage) are displayed regardless of the presence or absence of the user authentication.

Although partially described in the above description, on the display screen that displays the storage destination specifying selection button 21, as shown in FIGS. 5, 12 and 13, setting items ("color mode", "original document sending mode" and "reading resolution") having a high change frequency from the user are displayed at the lowermost part of the screen. With respect to the setting items, the content thereof may be changed without performing the screen switching (without selecting the second tab 5B).

In other words, in the exemplary embodiment, on the display screen (hereinafter, referred to as a "first display screen") that displays the storage destination specifying selection button 21, the setting items capable of being set in the box storage are also displayed, and the setting in the box storage may be changed without performing the screen switching. In other words, in the exemplary embodiment, on the first display screen that displays the storage destination specifying selection button 21, setting images (plural setting buttons) used when the user sets a reading condition when the image reading unit 108 performs image reading are also displayed.

On the other hand, on a display screen (hereinafter, referred to as a "second display screen") when the second tab 5B is selected, as shown in (A) of FIG. 6, other setting items capable of being set in the box storage are displayed. In other words, when the second tab 5B is selected, another setting image (another setting button) used when the user sets the reading condition when the image reading unit 108 performs the image reading is displayed. Specifically, on the second display screen, the setting image used for setting a reading condition different from the reading condition capable of being set by the setting image displayed on the first display screen is displayed. More specifically, on the second display screen, the setting images are displayed without displaying the storage destination specifying selection button 21.

In the exemplary embodiment, the setting items (three setting items) having a high change frequency are displayed on the display screen (the second display screen) when the second tab 5B is selected, in addition to the display screen (the first display screen) when the first tab 5A is selected. Thus, the user may also perform setting for each of the three setting items, on the display screen when the second tab 5B is selected.

In the exemplary embodiment, when the three setting items are displayed on the second display screen, the three setting items are displayed at the lowermost part of the screen. In other words, the three setting items are displayed as setting items disposed on the lowermost side among the plural setting items arranged in the longitudinal direction.

Here, if the three setting items are disposed at an upper position of the second display screen and the three setting items are displayed on the second display screen immediately after the second tab 5B is selected by the user, the three setting items are doubly displayed on both of the first display screen and the second display screen, and thus, there is a concern that it is difficult for the user to view the display screen (there is a concern that it is difficult to understand the content of the display).

For this reason, in the exemplary embodiment, as described above, the three setting items are arranged at the lower part of the second display screen. In other words, in the exemplary embodiment, on the display screen immediately after the second tab 5B is selected, the three setting items are not displayed (the three setting items are not displayed unless the display screen is scrolled downward), and thus, it is easy for the user to understand the content of the display.

In the above description, an example in which the display unit 107 is configured by the liquid crystal touch panel display and the selection of the storage destination specifying selection button 21 from the user is received by the display unit 107 is described, but the reception of the selection of the storage destination specifying selection button 21 from the user may be performed in a portion other than the display unit 107, such as a numeric keypad or a keyboard.

Further, in the exemplary embodiment, the image forming apparatus 10 is described. The image forming apparatus 10 may include various functions, and may be used as a device other than the image forming apparatus 10 according to combinations of the functions. For example, if the device is configured by the image reading unit 108, the display unit 107 and the control unit 100, the device may be used as an image reading apparatus (scanner). Further, if the device is configured by the display unit 107 and the control unit 100, the device may be used as a display apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   an image reader configured to read an image formed on a recording medium to generate image data;
   a display configured to display a plurality of selection images that are registered in advance respectively in correspondence with a plurality of users, each of the plurality of selection images being selectable, when displayed, by user input to designate a storage destination of the generated image data; and at least one hardware processor configured to implement an identifying section that identifies a user who stores the image data, wherein the display is configured to display, when the user is identified by the identifying section, a selection image, among the plurality of selection images, corresponding to the identified user, and to reduce a number of selectable options for storage destinations by reducing a number of the selection images to be displayed to be less than a number of all the plurality of selection images to display the selection image.

2. The image reading apparatus according to claim 1,
wherein when the user is not identified by the identifying section, the display does not display the selection image.

3. The image reading apparatus according to claim 1, wherein the at least one hardware processor is further configured to implement:

a setting section that sets a first display mode in which when the user is identified, the selection image corresponding to the identified user is displayed, and when the user is not identified, the selection image is not displayed, and a second display mode in which the selection image is displayed regardless of whether or not the user is identified.

4. The image reading apparatus according to claim 3,
wherein the display performs the display so that a display position when the selection image corresponding to the identified user is displayed in the first display mode and a display position when the selection image is displayed in the second display mode are different from each other.

5. The image reading apparatus according to claim 1,
wherein the plurality of selection images includes a selection image corresponding to a specific user and selection images corresponding to a plurality of users, and
the display performs the display so that the selection image corresponding to the specific user is disposed close to a side edge of a display screen and the selection images corresponding to the plurality of users are disposed on a central side in a display region with respect to the selection image corresponding to the specific user.

6. The image reading apparatus according to claim 1,
wherein the display displays a selection image for selecting the storage destination of the generated image data and a setting image used when the user sets a reading condition when the image reading section reads the image.

7. The image reading apparatus according to claim 6,
wherein when a display switching operation is performed by the user, the display performs display switching from a first display screen on which the selection image and the setting image are displayed to a second display screen, and displays the setting image on the second display screen without displaying the selection image.

8. A display apparatus comprising:
a display configured to display a selection image that is used when selection by a user among a plurality of users is performed, the selection image being from among a plurality of selection images that are respectively created for each user, corresponding to a number of the plurality of users, each of the plurality of selection images being selectable by user input when displayed; and at least one hardware processor configured to implement an obtaining section that obtains user identification information for identifying the user who performs the selection among the plurality of users, wherein the display is configured to display, when the user identification information is obtained by the obtaining section, the selection image of the user specified by the user identification information, and to reduce a number of selectable options for storage destinations by reducing a number of the selection images to be displayed to be less than a number of the plurality of users to display the selection image.

9. A non-transitory computer readable recording medium storing a program that causes a computer to execute:

a first display function of displaying, in a display section, a selection image that is used when selection by a user among a plurality of users is performed, the selection image being from among a plurality of selection images that are respectively created for each user, corresponding to at least a number of the plurality of users, each of the plurality of selection images being selectable by user input when displayed;

an obtaining function of obtaining user identification information for identifying the user who performs the selection among the plurality of users; and a second display function of displaying, when the user identification information is obtained by the obtaining function, the selection image of the user specified by the user identification information in the display section, and reducing a number of selectable options for storage destinations by reducing a number of the selection images to be displayed to be less than a number of the plurality of users to display the selection image in the display section.

10. An image reading apparatus comprising:
a display configured to display a first screen on which a selection image for selecting a storage destination of generated image data and a setting image used when a user sets a reading condition for when an image reading section reads an image are displayed and operable by the user to select the storage destination and set the reading condition, respectively, and a second screen on which the setting image is displayed without displaying the selection image.

11. An image displaying method comprising:
displaying, in a display section, a selection image that is used when selection by a user among a plurality of users is performed, the selection image being from among a plurality of selection images that are respectively created for each user, corresponding to at least a number of the plurality of users, each of the plurality of selection images being selectable by user input when displayed;

obtaining user identification information for identifying the user who performs the selection among the plurality of users; and displaying, when the user identification information is obtained by the obtaining, the selection image of the user specified by the user identification information in the display section, and reducing a number of selectable options for storage destinations by reducing a number of the selection images to be displayed to be less than a number of the plurality of users to display the selection image in the display section.

12. The image reading apparatus according to claim 1,
wherein the plurality of selection images includes the selection image corresponding to the identified user and a selection image corresponding to a plurality of users including the identified user, and the display displays, when the user is identified by the identifying section, the selection image corresponding to the identified user and the selection image corresponding to the plurality of users.

13. The image reading apparatus according to claim 12, wherein the display performs the display so that the selection image corresponding to the identified user is disposed close to a side edge of a display screen and the selection image corresponding to the plurality of users is disposed on a central side in a display region with respect to the selection image corresponding to the identified user.

14. The image reading apparatus according to claim 3, wherein in the second display mode, the plurality of selection images are displayed regardless of whether or not the user is identified.

15. The image reading apparatus according to claim 1, wherein the selection image specifically corresponds to the identified user with a 1:1 correspondence to the identified user.

16. The image reading apparatus according to claim 1, wherein when only one selection image is displayed as a result of the reducing the number of selection images, the one selection image is pre-selected upon display.

17. The image reading apparatus according to claim 1, wherein when a plurality of selection images are displayed as a result of the reducing the number of selection images, none of the plurality of selection images are pre-selected upon display.

18. The image reading apparatus according to claim 1, wherein when a user authentication of the user fails, the display is configured so as to not display the plurality of selection images.

* * * * *